United States Patent [19]

Masso

[11] 4,217,221
[45] Aug. 12, 1980

[54] OIL REFINING APPARATUS

[76] Inventor: Joseph I. Masso, 8761 Blue Lake Dr., San Diego, Calif. 92119

[21] Appl. No.: 36,744

[22] Filed: May 7, 1979

[51] Int. Cl.² ............................................. B01D 35/18
[52] U.S. Cl. ................................ 210/168; 123/196 R; 210/180; 210/416 L
[58] Field of Search ............... 210/175, 180, 181, 167, 210/168, 416 L; 165/102, 155, 164, 165; 159/14, 15; 202/158; 123/196

[56] References Cited

U.S. PATENT DOCUMENTS

| | | | |
|---|---|---|---|
| 1,828,644 | 10/1931 | Chlapowski et al. | 165/165 |
| 2,428,939 | 10/1947 | Morris | 210/180 |
| 2,785,109 | 3/1957 | Schwalge | 210/180 |
| 3,534,813 | 10/1970 | Flemy | 165/164 |
| 3,630,276 | 12/1971 | Paine et al. | 165/155 |
| 3,845,751 | 11/1974 | Runstetler | 210/180 |
| 3,956,071 | 5/1976 | O'Brien | 210/180 |
| 4,093,548 | 6/1978 | Sterkenburg | 210/180 |
| 4,096,910 | 6/1978 | Coffinberry et al. | 165/164 |
| 4,146,475 | 3/1979 | Lasland | 210/181 |

*Primary Examiner*—Theodore A. Granger
*Attorney, Agent, or Firm*—Henri J. A. Charmasson

[57] ABSTRACT

In combination with an internal combustion engine, a device for the purification of lubricating oil. Installed as a bypass between the outlet side of the oil pump and the crankcase, the device refines contaminated oil by boiling off under a suitable temperature range condition, contaminants such as condensed water, diluted fuel, and products resulting from partial decomposition of the oil. The device comprises a closed chamber admitting oil under pressure at the bottom of the chamber. The oil is forced through a maze formed by a stack of circular vanes before exiting near the top of the chamber and being returned to the crankcase. An electrical heating element under control of a thermostat heats the vanes to a temperature necessary to boil off the contaminants. The vaporized contaminants can escape through a vent in the top portion of the chamber.

5 Claims, 6 Drawing Figures

OIL REFINING APPARATUS

BACKGROUND OF THE INVENTION

This invention relates to devices for the purification and reclamation of lubricating mineral oils. A large part of contaminants found in used lubricating oil is constituted by foreign materials such as water condensed from air moisture, products of fuel combustion, fuel dilution, and products resulting from chemical action within the system such as products of partial decomposition of oil and incomplete combustion of fuel which have a lower boiling point than the mineral lubricating oil. In the reclamation process of used lubricating oil, these products are boiled off under suitable temperature conditions. Normally, a certain amount of purification is achieved in an internal combustion engine which is allowed to run at a relatively high temperature. In an automobile, truck, tractor, or heavy equipment engine which is often run for a short period of time and in which the temperature is very efficiently limited by a pressurized water cooling system, the heat purification process is practically non-existent. These volatile contaminants are not retained by conventional oil filters and contribute to the early deterioration of the lubricating agent. The combination of a mechanical filter and evaporation system for the on-line purification of lubricating oil in an internal combustion engine would greatly increase the period between oil changes and improve the efficiency of the power system.

SUMMARY OF THE INVENTION

The principal object of this invention is to provide a device for the treatment by heat process of used lubricating oils.

Another object of this invention is to provide such a device that can be operated on-line in conjunction with an internal combuston engine.

A further object of this invention is to provide a device for a continuous on-line refining of the lubricating oil of an automotive engine.

An additional object of this invention is to provide such a device installed as a bypass between the pressurized oil circuit and the crankcase of the engine.

These and other objects of the invention are achieved by a heating chamber receiving oil from the outlet side of the oil pump and forcing it to pass through a maze of heating vanes before returning it to the crankcase. The vanes are in contact with an electrical heating element controlled by a thermostat which senses the temperature of the oil flowing out of the chamber.

DESCRIPTION OF THE PREFERRED EMBODIMENT OF THE INVENTION

Figure 1:
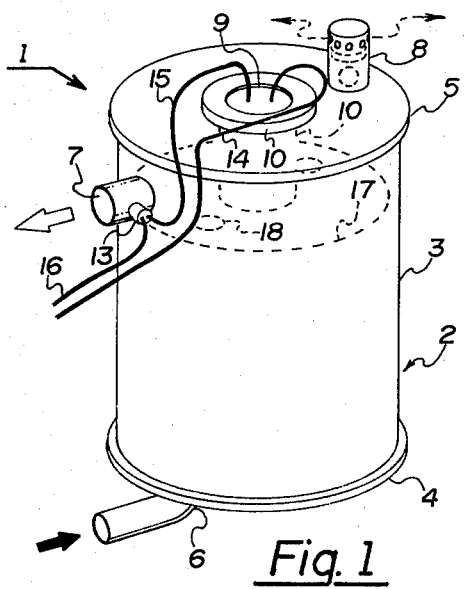
FIG. 1 is a perspective view of the refining apparatus.
Figure 2:
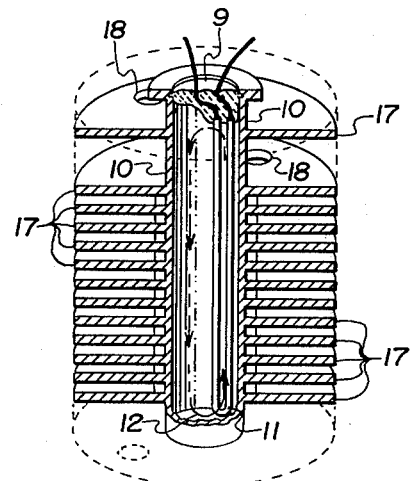
FIG. 2 is a cross sectional view of the interior structure of the apparatus.
Figure 3:
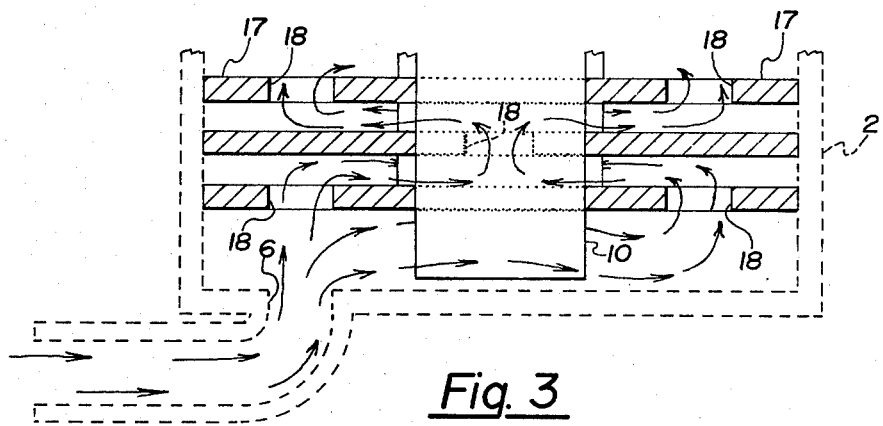
FIG. 3 is a diagram showing the oil flow between the heating vanes inside the apparatus.
Figure 4:
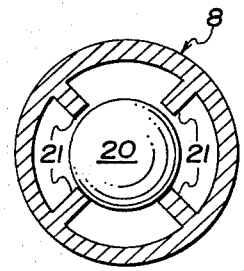
FIG. 4 is a top view of a horizontal cross section of the lower half of the vapor outlet.
Figure 5:
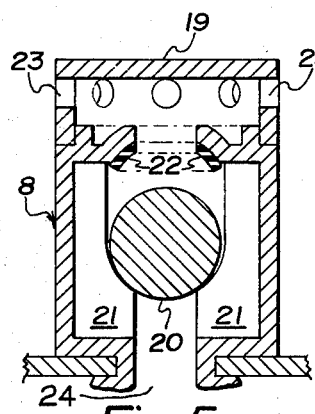
FIG. 5 is a cross sectional view of the vapor outlet taken along a vertical diametrical plane.
Figure 6:
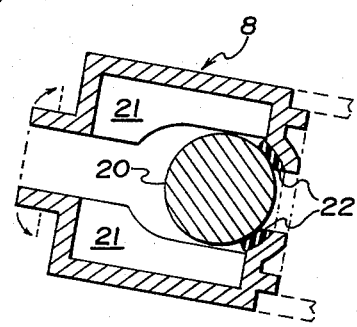
FIG. 6 is a partial cross sectional view similar to FIG. 5 showing the vapor outlet in the tilted, closed position.

Referring now to the drawing and according to the invention, there is shown an oil refining apparatus 1 designed to operate in „mbination with an internal combustion engine. The refining apparatus 1 comprises a canister 2 which is preferably mounted alongside the engine. In the base plate 4 of the canister 2 is an inlet 6 normally connected by conduits to a section of the engine containing pressurized oil, preferably near the outlet side of the oil pump. This is most effectively done by tapping by means of a T-connector between the engine block and the oil pressure sensor. Near the top of the canister 2 is an outlet 7 designed to be connected to the engine crankcase. The inlet conduit and orifice 6 should preferably have a quarter inch (6.25 millimeters) diameter. The outlet conduit and orifice 7 should preferably have a one-half inch (12.5 millimeters) diameter. In the center of the canister 2 is a sealed housing 10 in the shape of a cylindrical column. In the top plate 5 of the canister 2 is a vapor outlet 24 capped by a safety tilt valve 8. Inside the cylindrical housing 10 is a heating element 9 comprising a resistance 11 immersed into a heat conductive fluid 12 not unlike the so-called transformer oil. The chamber inside the canister 2 is divided by a series of horizontal, disc-shaped vanes 17 extending radially from the cylindrical housing 10. The cylindrical housing 10 and the vanes 17 are made of a highly heat-conductive material such as copper, and each vane 17 is intimately bonded to the cylindrical housing 18. This bonding may be achieved by brazing each metal vane 17 to the cylindrical housing 10 or by threading the cylindrical housing 10 on its entire length as well as the hub of each vane 17, and then bolting the vanes 17 on the column at regular intervals. Each vane 17 has two orifices 18 pierced through it at diametrically opposed locations on each side of the cylindrical housing 10. The orifices 18 are oriented such that they are located 90° apart from the orifices of the adjacent vanes. The thickness of the vanes 17 and the spacing between them is preferably one-eighth of an inch (3.127 millimeters). The diameter of each orifice is preferably one-quarter inch (6.25 millimeters). The heating element 11 is . . . connected to a source of electrical power such as the battery of an automotive vehicle by means of electrical conductors 14, 15 and 16. One conductor 15 is run through a thermostat 13 which senses the temperature at the outlet 7 of the canister 2. When that temperature reaches a certain predetermined level the electrical path between conductors 15 and 16 is interrupted. The pressurized oil coming from the engine will enter the canister through inlet 6 and flow through the inside chamber following a circuitous path from one vane to another as better illustrated in FIG. 3. Heat from the heating element 11 transmitted through the vanes 17 increases the temperature of the oil causing the evaporation of the volatile contaminants contained in the oil. The oil flows out of the canister 2 through outlet 7 and is returned to the engine crankcase. The difference in diameter between the inlet 6 and the outlet 7 guarantees that the oil level inside the canister will never exceed the level of the outlet 7. Vapors from contaminants escape through the outlet 24. The thermostat 13 is preferably selected to permit the oil to reach a temperature of approximately 750° Fahrenheit (400° Celsius). The arrangement of the vanes 17 and the size of the orifices 18 assures that the oil pressure is progressively decreased as the oil flows upward through the chamber inside the canister 2. The safety valve 8 mounted above the vapor outlet 24 is designed to close in case of the accidental upsetting of the canister 2 in order to prevent the oil from spilling out of the canister. The valve comprises a ball 20 normally sitting on top of four support vanes 21. Vapors from the canister can escape from the ball 20 by circulating between the vanes 21. They then proceed through a valve seat 22 into the upper part of the valve 19 and through venting ports 23. If the canister 2 is upset, the ball 20 rolls toward the valve seat 22 completely obstructing the exit path. The dimensional considerations given herein are generally applicable to refining apparatus designed to operate in combination with an automobile engine. Their absolute value and respective ratios may have to be adjusted in other applications as a function of engine size and the degree of oil reclamation desired. An excessive flow of oil through the refining apparatus may cause intolerable loss of oil pressure in the engine. On the other hand, a very limited bypass diversion of the oil toward the refining system will not provide a sufficient degree of refining and will not avoid accumulation of volatile contaminants in the oil if the engine is used during only very short periods.

While I have described the preferred embodiment of my invention and suggested modifications thereto, other embodiments and other modifications may be devised without departing from the spirit of my invention and the scope of the appended claims.

The invention claimed is:

1. In combination with an internal combustion engine, an apparatus for refining motor oil which comprises:
    a closed chamber having an oil inlet in the base section;
    a vapor outlet in the upper section;
    an oil outlet at an intermediate level between the oil inlet and the vapor outlet;
    means for heating the interior of said chamber having:
        a vertical tubular column in the center of the chamber;
        a plurality of vanes extending radially from said column across said chamber;
        a heating resistor within the column; and
        means for connecting the resistor to a source of electrical current;
    means for connecting the inlet to a source of pressurized oil in the engine; and
        means for connecting the oil outlet to the engine crankcase.

2. The apparatus claimed in claim 1 wherein each said vane extends horizontally across the entire width of the chamber and is pierced with at least one hole whereby said hole allows the oil from passing from under said vane to above said vane as it flows from said inlet toward said oil outlet across the chamber 3. The apparatus claimed in claim 2 wherein said oil on a first vane and said oil on a second vane adjacent to the first vane are located on widely separated radii.

4. The apparatus claimed in claim 2 wherein said oil outlet has a diameter greater than the diameter of said inlet.

5. The apparatus claimed in claim 4 wherein:
    said chamber is a vertical cylinder;
    said vanes are horizontal discs intimately bonded to the central column.

* * * * *